March 3, 1942.  J. C. FOX  2,274,892
AUTOMOBILE DOOR PULL
Filed June 10, 1941
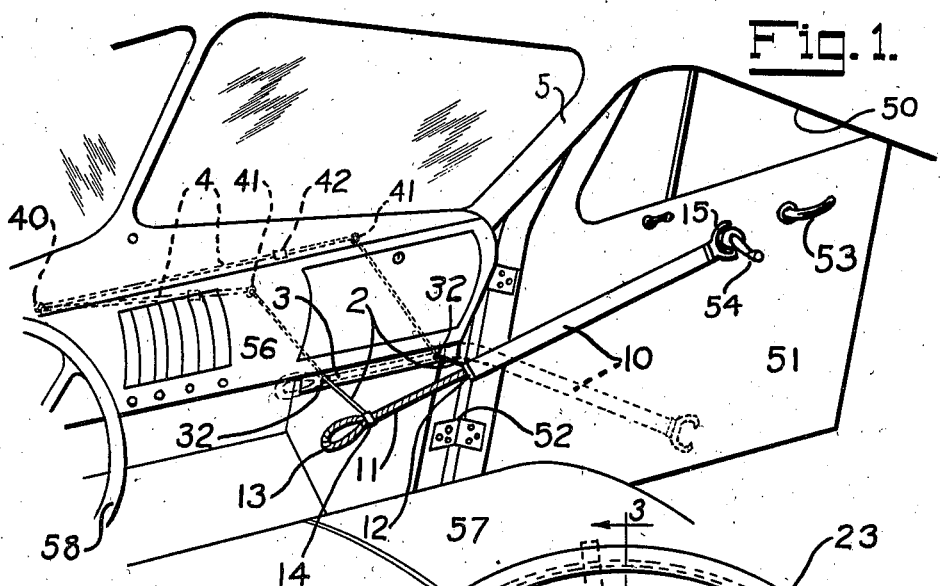
Fig. 1.
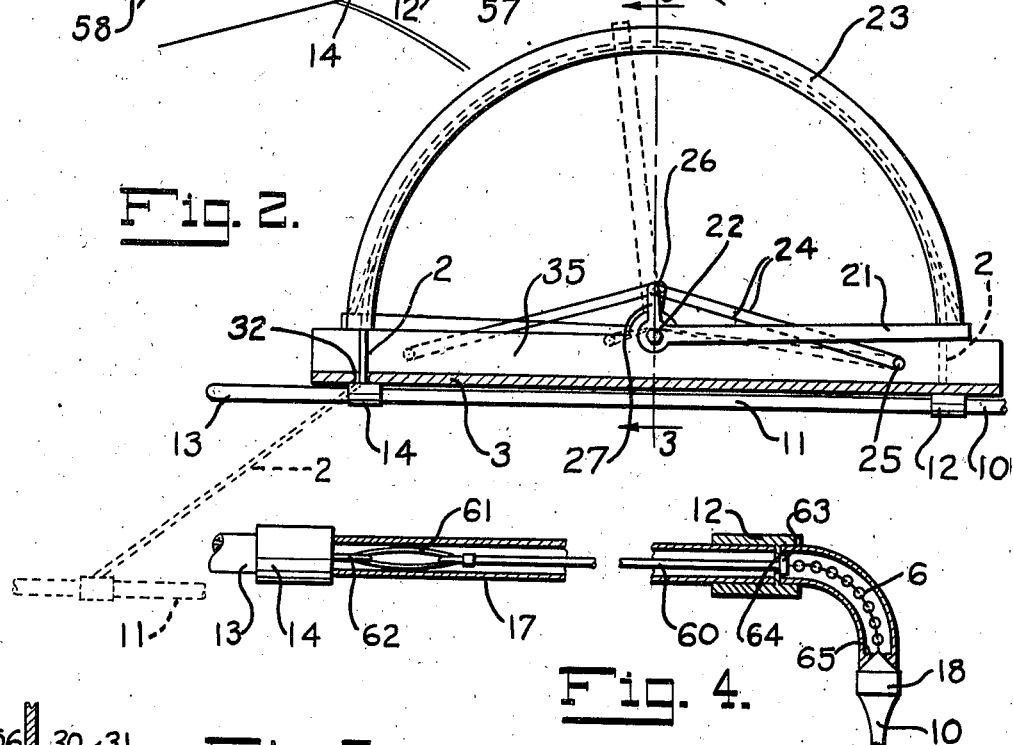
Fig. 2.
Fig. 4.
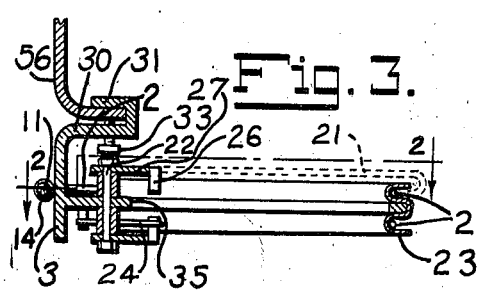
Fig. 3.
Inventor
Joseph Chester Fox
By Reynolds Beach
Attorneys Patented Mar. 3, 1942

2,274,892

UNITED STATES PATENT OFFICE 2,274,892

AUTOMOBILE DOOR PULL

Joseph Chester Fox, Seattle, Wash.

Application June 10, 1941, Serial No. 397,401

13 Claims. (Cl. 296—1)

The front seat in present automobiles is so wide that the driver has difficulty in reaching the door on the opposite side to open it, and if the driver must close the door on the opposite side, he has difficulty reaching it at all, though he stretch full length across the seat, and usually he must shift his position along the seat in order that he can grasp the door by some handle located sufficiently to the rear of the door hinge that he has ample leverage to close the door without straining.

Various attempts have been made to provide door pulls more readily operated or located more conveniently to the driver. Some such devices, while suitable for use in buses, are scarcely suited for use in private passenger cars, either because of first cost, the installation cost, or the necessities of conserving space. Other such devices which have been proposed for use in passenger cars have been found objectionable, either because they were not sufficiently within reach of the driver in the wide front seat of present day cars, or not sufficiently out of the way when not in use, or because by reason of their inherent nature, they produced rattles, or wear upon the upholstery.

Accordingly, it is an object of the present invention to provide a door pull peculiarly adapted for use in private passenger cars, which when not in use is fully out of the way and does not interfere with any part of the car, which is in position to be readily grasped by the driver without moving from his seat, which gives ample leverage to close the door, which is simple and inexpensive in first cost, and easy and inexpensive to install, which can be adapted for installation upon substantially all makes of automobiles and occupies but little room, which is rugged and simple in construction, and has no parts which are likely to cause rattles or squeaks or to wear the upholstery.

With these and other objects in mind, as will appear hereafter, my invention comprises the novel door pull, and the novel combination and arrangement of the parts thereof relative to each and relative to the automobile structure and door, all as shown in the accompanying drawing and as will be described later in this specification, and which will be particularly pointed out in the claims which terminate the same.

Figure 1 is a perspective view of the interior of an automobile, looking from the driver's side toward the open door at the opposite side, illustrating the manner of use of my invention.

Figure 2 is in general a plan view, though taken in section on the line 2—2 of Figure 3, illustrating the resilient retracting mechanism in a preferred form, and Figure 3 is a transverse section on the line 3—3 of Figure 2, further illustrating the same.

Figure 4 is a longitudinal sectional view, in plan, illustrating an alternative form of a part of the tension member.

The automobile body is represented generally at 5, defining the door opening 50, normally closed by the door 51 hinged along its forward edge to the automobile body at 52. The door handle controlling the latch is represented at 53; 54 represents the normal window winder, and the dash is represented at 56; 57 is the front seat. The steering wheel is represented at 58. The driver, seated behind the steering wheel, can barely reach the latch 53 to open the closed door, and even a driver of exceptional height and reach can not, without shifting from behind the steering wheel, reach the handle 53 or even the winder 54 to close the outswung door.

My door pull employs a tension member, which may be considered as made of two parts. One part 10, which may be termed the strap, normally lies alongside the door when the door is closed, and at one end it is arranged to be secured to the door outwardly—that is, rearwardly—of the hinge 52. The other part of the tension member, conveniently a cord 11, forms a continuation of the forward end of the strap 10, and the two are joined as indicated at 12. The cord 11 is intended to extend across the interior of the body to a position where some portion of its inner end, which may be conveniently formed as a hand loop 13, may be grasped at all times by the driver behind the steering wheel.

The precise nature of the parts of the door pull, and the precise arrangement of these parts relative to the automobile may vary from those described. As to the tension member as a whole, the important thing is that it be connected at one end to the door, sufficiently to the rear of the hinge to afford good leverage in closing the door, that its opposite end lie within convenient grasp of the driver, and that this transversely extending end be held retracted against some part of the automobile body when not in use, but that it be permitted to straighten out when pulled by the driver in attempting to close the door. It is desirable that the tension member have a certain amount of flexibility, at least sufficiently that it will hinge around the angle between the door and the dash, for instance, in the vicinity of the front jamb of the door or the line of the front hinge. Except for this flexibility the tension member might be otherwise a rigid member, but since rigid members might rattle, or might wear upholstery, and because it is convenient and cheap to make them of fabric materials, the strap 10 may conveniently be a piece of stout strapping, such as is employed in assist handles, and the cord 11 may be of similar material, rounded, braided, or laid like a rope. When the cord is held retracted, as described, the strap of necessity is held retracted against the door.

Nor it is important what part of the automobile body supports the cord portion 11. It might conceivably be supported in the top, but it has been found convenient, both for installation and use, to hold the cord 11 close against the dash 56, along the lower margin thereof.

To the latter end (bearing in mind the necessity of automatic retraction to the cord, yet for yieldability and flexibility of movement in pulling the door closed), the cord 11 is conveniently supported by at least one and, as shown by two (or more) strings 2, one of which is secured at 12 and the other of which is secured at 14. These two points along the cord 11 are located approximately at the ends of the cord portion 11 of the tension member. These strings 2 are suitably guided, as by the similarly spaced-apart eyes 32, which eyes are supported from the automobile body in any suitable fashion. These eyes may be separately formed, or more conveniently, they may be formed as holes in a base 3 adapted for securement beneath the dash 56. A convenient manner of securement is illustrated in Figure 3, wherein the horizontal flange 30 extends rearwardly from the space beneath the lower edge of the dash, a reverse forwardly extending flange 31 overlies the rear edge of the dash, and clamp screws 33 hold the base upon the dash.

Now it will be understood that if the strings 2 are pulled taut, they will pull the cord 11 back snugly against the base 3, and will hold the cord there, stretching the cord sufficiently that it will not sag in the middle. However, additional intermediately connected strings may be employed, if desired, to prevent sagging of the cord. It is further evident that if the strings 2 are resiliently held thus taut or retracted, they will yield to permit the cord 11 to be pulled out into alignment with the strap 10 when the hand loop 13 is pulled. The precise manner of applying tension to the strings 2 may vary, and as typical of the principle, but not necessarily as representing the best commercial form, I have illustrated the elastic or so-called rubber band 4 connected in Figure 1 to the inner ends of the strings 2 and anchored at 40 beneath the dash. The strings in this form are shown as extending also through eyes or other guides 41, and the connectors 42 which join the elastics 4 and the strings 2 engage the eyes 41 to serve as limit stops, to prevent any possibility of damage or breaking of the elastic.

This, however, is but one means of accomplishing the result, and is not so desirable commercially as the form which is shown in Figures 2 and 3.

One of the requirements for such a resiliently yieldable retracting means, is that it be thin and occupy but little vertical space, since it is frequently necessary to locate a heater or radio speaker immediately beneath this end of the dash. Accordingly, the retracting means shown in Figures 2 and 3 consists of an arm 21 pivoted at 22 on the base 3 or its flange 35, to the outer or swinging end of which arm the inner end of a string 2 is connected. In order to secure adequate length of string without undue length of arm, preferably there are provided circular segmental channel members 23, constituting guides for the strings 2, and supported from the base 3. Each arm 21, pivoted concentrically of the guide 23, is provided with resilient means to urge it in a direction to pull in and retract its string 2. Such means may be conveniently an elastic band 24, anchored to the base 25 and connecting at 26 to a short, angled arm 27 of the arm 21.

The tension members, and particularly the end of the strap 10, is anchored to the door in any convenient manner. A snap-engaging anchorage 15 is attached to this end of the strap, and by drilling two diametrically opposite holes in the base of the winder 54 or some similar element of the door's hardware, the strap may be attached with little difficulty. The retracting means and support for the cord 11 may likewise be attached to the dash with little difficulty, particularly if it is in the unitary form shown in Figures 2 and 3. The entire device is therefore quickly attachable with little installation cost, and can readily be sold as an accessory, or if desired it can be built into the car.

Since retraction of the cord 11 when not in use is a primary desideratum, in some cases the innermost end may be fixedly anchored to the dash, and only its outermost end, adjacent the door hinge, need be resiliently retractable. Its inner end, just outside the anchorage, can be grasped to pull it into alignment with the strap.

It is believed the manner of use will be evident. When the door is closed, the tension member will normally lie in the dash line position of Figure 1. The cord 11 will be pulled against the base 3 by the tension on the strings 2, however obtained, and this will hold the strap 10 close alongside the door. When the door is swung open, there is substantially no change in the position of the parts of the tension member, the strap 10 merely swinging outwardly as the door swings open. There may be some slight pull on the strings 2 by reason of the distance of the hinge line outwardly from the inside of the door jamb, but this is not of any material importance. When it is desired to close the door, the driver merely grasps the loop 13 and pulls it toward him. This pulls the cord 11 away from the base 3. The cord aligns with the strap 10, as shown in the full line position of Figure 1, and by continuing to pull on the loop 13, the door is closed. Upon releasing the loop, the tension means attached to the strings 2 pull these strings inwardly and return all parts to their initial position.

Because there may be some tendency, particularly when the hinge line of the door is materially outwardly of the jamb, for the opening of the door to pull out the strings 2 and to draw the handle loop 13 away from the driver, means may be provided as a refinement to permit this movement of the strap portion 10 relative to the cord portion 11, without disturbance of the retracted position of the cord 11. An arrangement to this end is shown in Figure 4.

Here, the cord portion 17 is made hollow. The strap 10 is not connected directly to the adjacent end of the cord portion 17, but a chain or the like, indicated at 6, extends from the anchor member 18 at the end of the strap 10, to a string 60 inside the hollow cord member 17. An elastic 61 is connected to the opposite end of the string 60, and is anchored at 62 to the connector 14. A collar 63 serves as a convenient stop, moving with the string 60 and chain 6 between stop shoulders 64 and 65.

As the door swings open, the cord 17 is held securely by its stronger elastics 24, but pull on the strap 10 causes the weaker elastic 61 to yield, and the tension member as a whole is extended in length, the chain 60 pulling outwardly of the hollow cord member 17. When the loop 13 is pulled upon, the collar 63 bottoms on the stop shoulders 65 and limits further lengthening of the tension member as a whole, and thence transmits the pull to the door.

Elastics have been used by preference as the resilient extension members, because they are readily available for replacement if broken, and have no tendency to create any noise.

What I claim as my invention is:

1. In combination with an automobile body and door, a tension member secured at one end to the door, outwardly of its hinge, its opposite end extending across the automobile body, and resiliently extensible means normally holding such latter end retracted, but yieldable under the tension of a pull on said member in closing the door.

2. In combination with an automobile body and door hinged at its forward edge, a tension member having a door-engaging end secured to the door behind the hinge and extending thence forwardly alongside the door, and having a hand-engaged end formed as a continuation of the first-mentioned end and extending transversely across the body in the vicinity of the dash, and resiliently extensible and flexible means normally holding the hand-engaged end retracted adjacent the dash, but yieldable under tension, as the two ends of said tension member are aligned in pulling the door shut.

3. In combination with an automobile body and door hinged at its forward edge, a tension member having a door-engaging end secured to the door behind the hinge and extending thence forwardly alongside the door, and having a hand-engaged end formed as a continuation of the first-mentioned end and extending transversely across the body in the vicinity of the dash, resiliently extensible and flexible means normally holding the hand-engaged end retracted adjacent the dash, but yieldable under tension, as the two ends of said tension member are aligned in pulling the door shut, and resiliently extensible means interconnecting the two ends of said tension member, for extension, without extension of the first-mentioned such means, upon opening of the door, the last-mentioned extensible means incorporating stops limiting their extension, to transmit a pull for closing the door.

4. In combination with an automobile body and door hinged along its forward edge, a strap secured to the door to the rear of the hinge, and extending thence forwardly alongside the door to the vincinity of the hinge, a cord flexibly connected to said strap in the vicinity of such hinge, and extending thence transversely of the body, a cord support including two strings, one secured by one end to said cord adjacent the hinge and the other similarly secured to said cord adjacent the cord's inner end, guides for said strings secured to the dash, and spaced apart similarly to the spacing, along the cord, of the points of securement of the strings, and resilient means connected to the other ends of said strings, and normally holding the cord retracted and extended, alongside the dash, but permitting extension of the strings and alignment of the cord with the strap by a pull upon the cord, in closing the door.

5. In combination with an automobile body and door, a tension member secured at one end to the door, outwardly of its hinge, its opposite end extending across the automobile body, strings secured by one end to the latter end of the tension member at spaced points, and similarly spaced guides for such strings supported by the automobile body, arms pivotally mounted upon the body, to each of which the opposite end of a string is secured, and resilient means urging said arms in a direction to withdraw the strings, and thereby to hold the tension member, between the strings, in retracted position, said resilient means being yieldable under the influence of tension, as said tension member is pulled to close the door.

6. In combination with an automobile body and door, a tension member secured at one end to the door, outwardly of its hinge, its opposite end extending across the automobile body, strings secured by one end to the latter end of the tension member at spaced points, and similarly spaced guides for such strings supported by the automobile body, arms pivotally mounted upon the body, to each of which the opposite end of a string is secured, a circular-segmental guide for each such string, disposed adjacent the swinging end of the corresponding arm, and resilient means urging said arms in a direction to withdraw the strings, and thereby to hold the tension member, between the strings, in retracted position, said resilient means being yieldable under the influence of tension, as said tension member is pulled to close the door.

7. An automobile door pull comprising, in combination with a flexible tension member adapted to be secured at one end to the door, rearwardly of its hinge, and of a length to extend thence forwardly to the vicinity of the hinge and thence transversely along the dash, a support for the transversely extending end of the tension member comprising two strings secured to such end adjacent the hinge and adjacent its inner end, respectively, eyes constituting guides for said strings and formed for support from the dash at correspondingly spaced points, and resilient means likewise formed for support from the dash, operatively engageable with the strings to tension them, and thereby to normally hold the tension member retracted close to the dash, but yieldable to permit alignment of the two ends of the tension member, in pulling the door shut.

8. A door pull as in claim 7, characterized in that the two ends of the tension member are separate, and join adjacent the door hinge, resilient means joining such two ends, permitting the extension of one relative to the other, and stop means limiting such extension.

9. An automobile door pull comprising, in combination with a flexible tension member adapted to be secured at one end to the door, rearwardly of its hinge, and of a length to extend thence forwardly to the vicinity of the hinge and thence transversely along the dash, a bar of a length approximating that of the latter extension of the tension member, and having an eye at each end, means to support said bar from the dash, a string threaded through each eye and secured to the adjacent end of the tension member, and resilient means formed for support beneath the dash, and engaged with said strings, to pull the transverse extent of the tension member, through said strings, close to the bar, but permitting movement thereof into alignment with its door-connected end under the influence of a pull in closing the door.

10. An automobile door pull comprising, in combination with a flexible tension member adapted to be secured at one end to the door, rearwardly of its hinge, and of a length to extend thence forwardly to the vicinity of the hinge and thence transversely along the dash, a bar of a length approximating that of the latter extension of the tension member, and having an eye at each end, means to support said bar from the dash, a string threaded through each eye and secured to the adjacent end of the tension member, a circular-segmental guide channel supported from the bar in position to receive each such string, an arm corresponding to each string, and concentrically pivoted upon the bar, to which the inner end of each string is secured, and resilient means urging said arms in directions to withdraw the strings and to normally pull the corresponding end of the tension member closely against the bar.

11. A door-pull for automobiles comprising a flexible member having means at one end for attachment to the door, rearwardly of its hinge, and formed at its opposite end to be grasped for pulling, means engageable with the flexible member adjacent its grasping end and also adjacent the door's front jamb, for normally supporting such portion of the flexible member extending across and close to the dash, said supporting means including also a resilient device yieldable for separation of the flexible member from the dash during a pull thereon, and by its resilience returning the flexible member to its normal position when tension thereon is released.

12. In combination with an automobile body and door hinged at its forward edge, a tension member having a door-engaging portion secured to the door behind the hinge and extending thence forwardly alongside the door to the vicinity of the hinge, and having a hand-engaged portion formed as a continuation of the first-mentioned portion and extending transversely across the body in the vicinity of the dash, means to support the inner end of the hand-engaged portion close to the dash, and resiliently extensible and flexible means normally holding the outer end of the hand-engaged portion, close to the door hinge, retracted adjacent the dash, and thus to hold the door-engaging portion close to the door, but yieldable under tension, as the two portions of said tension member are aligned in pulling the door shut.

13. A door pull for attachment to the right front door of an automobile, to the rear of the door's hinge, and for support from the dash in a position convenient to the driver at the opposite side of the automobile, said door pull being formed as a tension member comprising two principal parts, one of said parts being a door-engaging portion formed for securement to the door behind the hinge, and of a length to extend thence forwardly alongside the door to the vicinity of the hinge, the other part of the tension member being a hand-engaged portion, formed as a continuation of the door-engaging portion, and of a length to extend transversely across the body from the vicinity of the hinge to a point within convenient reach of the driver, and lying generally in the vicinity of the dash, means to support the inner end of the hand-engaged portion close to the dash, and means normally active to hold the outer end of the hand-engaged portion, adjacent the door hinge, retracted adjacent the dash, but yieldable under tension, as the two portions of said tension member move towards alignment in pulling the door shut.

JOSEPH CHESTER FOX.